(12) United States Patent
Schneider et al.

(10) Patent No.: US 6,445,719 B1
(45) Date of Patent: Sep. 3, 2002

(54) METHOD, SYSTEM AND APPARATUS FOR REDUCING SYNCHRONIZATION AND RESYNCHRONIZATION TIMES FOR SYSTEMS WITH PULSE STUFFING

(75) Inventors: Kevin W. Schneider; Jamie Kelly; Dennis B. McMahan; Marc Kimpe, all of Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/384,760

(22) Filed: Aug. 27, 1999

Related U.S. Application Data
(60) Provisional application No. 60/098,228, filed on Aug. 28, 1998.

(51) Int. Cl.[7] .............................................. H04L 12/50
(52) U.S. Cl. ...................... 370/506; 370/509; 370/510
(58) Field of Search ............................... 370/506–514, 370/358–362, 386, 463–466, 395, 522; 472/474, 545, 357; 506/508, 522; 375/365, 366–371

(56) References Cited

U.S. PATENT DOCUMENTS

| | | | | | |
|---|---|---|---|---|---|
| 3,798,378 A | * | 3/1974 | Epstein | ....................... | 370/510 |
| 4,259,738 A | * | 3/1981 | Liskov et al. | ............... | 370/506 |
| 4,649,538 A | * | 3/1987 | Deluca et al. | ............. | 340/7.45 |
| 5,757,869 A | * | 5/1998 | Sands et al. | ................ | 370/506 |

* cited by examiner

*Primary Examiner*—Kwang Bin Yao
*Assistant Examiner*—Prenell Jones
(74) *Attorney, Agent, or Firm*—John A. Fogarty, Jr.; Baker Botts L.L.P.

(57) ABSTRACT

A method, system and apparatus for decreasing the time frame synchronization and resynchronization in a data communication uses an long frame sync word formed by combining a frame sync word with stuff bits, wherein the stuff bits are necessary for timing adjustments.

28 Claims, 7 Drawing Sheets

| NEXT STATE / CURRENT STATE | OUT OF SYNC STATE | WAIT STATE | IN SYNC STATE | ERROR STATE |
|---|---|---|---|---|
| OUT OF SYNC STATE | LFSW FOUND = 0 | LFSW FOUND = 1 | N/A | N/A |
| WAIT STATE | MATCH FOUND = 0 | N/A | MATCH FOUND = 1 | N/A |
| IN SYNC STATE | N/A | N/A | MATCH FOUND = 1 | MATCH = 0 |
| ERROR STATE | MATCH FOUND = 0 | N/A | MATCH FOUND = 1 | N/A |

METHOD, SYSTEM AND APPARATUS FOR REDUCING SYNCHRONIZATION AND RESYNCHRONIZATION TIMES FOR SYSTEMS WITH PULSE STUFFING

PRIORITY APPLICATION

This application claims priority to United States Provisional Application Ser. No. 60/098,228 filed on Aug. 28, 1998, entitled "Analysis of HDSL2 Frame Synchronization."

FIELD OF THE INVENTION

The present application relates in general to the field of telecommunications and data transmission. More specifically, the present invention relates to a method, system and apparatus for acquiring frame synchronization and re-synchronization over a data communication system using pulse stuffing. The time to acquire initial frame synchronization is reduced by approximately a factor of two and the time for resynchronization is also substantially reduced. The present invention is particularly useful for reducing the amount of data lost during frame synchronization and resynchronization operations.

BACKGROUND OF THE INVENTION

Conventional data communication systems typically transfer data in groups or blocks of words commonly referred to as data "frames." Each frame is a cyclic set of consecutive time slots having a structure that defines the relative position of each time slot and the transmitted or "payload" data stream contained therein. In addition to the payload data, frames contain overhead bits whose function is typically to ensure synchronization, error detection and operation and maintenance, etc. However, the greater the ratio of overhead bits to data bits the lower the efficiency of the corresponding communications channel. Frames ordinarily must be synchronized in time in order for a receiver to properly reconstruct a data stream transmitted over a communications channel.

Frame synchronization ("sync") or resynchronization ("resync") is typically accomplished by designating a portion of each data frame as a "frame sync word" (FSW). Typically, the FSW is a pattern of bits placed at the beginning of each data frame that functions as a reference point or marker for a receiver processing data transmitted over a data communications channel. The FSW is usually combined with the data stream at the transmitter to form the data frames, which data frames are then modulated, transmitted over a data communications channel, and demodulated at a receiver. The demodulated signal is a data stream containing the FSW. The FSW is then detected by a deframer using an FSW detector in order to acquire frame synchronization. Optionally, a scrambler is provided in the transmitter for randomizing data along with a corresponding descrambler in the receiver.

Characteristics of frame sync words have been extensively studied and are discussed in textbooks such as Bernard Sklar, *Digital Communications Fundamentals and Applications*, pp. 460–464 (Prentice Hall 1988), and J. J. Spilker, Jr., *Digital Communications by Satellite*, pp. 449–454 (Prentice Hall 1977). An FSW must have good synchronization properties in order to ensure reliable data transfer over a data communications channel. An FSW has good sync properties when the FSW have small "correlation sidelobes," which usually requires a certain number of dedicated "overhead" bits to represent the FSW information. The above-cited references have tables containing FSW's with good properties and also provide examples showing how to determine the correlation sidelobes for a sequence of bits.

However, using too many overhead bits is often undesirable especially in data communication systems having limited bandwidth. A greater number of overhead bits can add undesired complexity to both the framing and deframing operations in the transmitter and receiver, respectively, and reduce the efficiency of the communication system. Therefore, although it is generally accepted that a well designed "longer" FSW has better sync properties than a shorter FSW, e.g., a 14 bit sync word as compared to a 10 bit sync word, it is often desirable to use the shorter FSW in order to reduce the complexity and cost of the system. Thus, there is a need to limit the number of overhead bits used for frame synchronization and resynchronization without compromising frame sync or resync performance.

SUMMARY OF THE INVENTION

The aforedescribed limitations and inadequacies of conventional methods and systems for frame synchronization and resynchronization are substantially overcome by the present invention, in which a principal object is reduce the time for frame synchronization and frame resynchronization without adding overhead bits to a data frame. This principal object is to be satisfied without compromising frame sync and resync performance.

Another object of the present invention is to provide a data communication system that has a robust sync and resync performance without significantly increasing the complexity of the framing and deframing operations in the corresponding transmitters and receivers.

The above and other objects are satisfied by a method, system and apparatus that provides a long frame sync word (LFSW) by uniquely combining a conventional frame sync word with stuff bits from the immediately preceding data frame.

In a first aspect of the present invention, a method is provided for acquiring frame synchronization or resynchronization in a system communicating data frames between a transmitter and a receiver. The method includes the steps of: generating a first frame sync word located at the beginning of a first data frame; appending payload and overhead bits to the end of the first frame sync word; appending stuff bits to the end of the payload and overhead bits, wherein the stuff bits function to correct timing offsets; generating a second frame sync word located at the beginning of the a second data frame; detecting a long frame sync word formed by the combination of the stuff bits and the second frame sync word; and acquiring frame synchronization based at least in part upon the detected long frame sync word.

In accordance with another aspect of the invention, the step of appending stuff bits further includes the step of appending a sequence of stuff bits having a complementary sync characteristic when combined with the second frame sync word. Using such a stuff bit sequence yields a long frame sync word having an enhanced frame sync property which in turn significantly reduces the mean time-to-sync of the receiver.

In yet another aspect of the present invention, a system is provided for acquiring frame synchronization of data frames transmitted over a data communications channel. The system includes: a framer for providing a first frame sync word at the beginning of a first data frame, for attaching a sequence of stuff bits at the end of the first data frame to correct timing offsets, and for providing a second frame sync word at the beginning of a second data frame; and a deframer for detecting the occurrence of stuff bits followed by the second frame sync word, whereby the combination of the stuff bits and the second frame sync word forms a long frame sync word having an enhanced frame synchronization property.

In still another aspect of the present invention, a transmitter apparatus for generating a sequence of data frames wherein the sequence contains frame sync words and long frame sync words is also provided. The apparatus includes: means for detecting timing offsets between a transmitter clock and a receiver clock, the detecting means providing a pulse stuff signal; and a framer for inserting a frame sync word at the beginning of each frame and for inserting sync compatible stuff bits at the end of selected frames in response to the pulse stuff signal. A receiver apparatus is also provided having: a means for detecting a long frame synchronization word; a means for detecting a frame synchronization word; and a circuit means for acquiring frame synchronization in response to the output of the two detecting means, wherein the circuit means is an arrangement of digital circuit elements programmed according to a frame synchronization algorithm.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
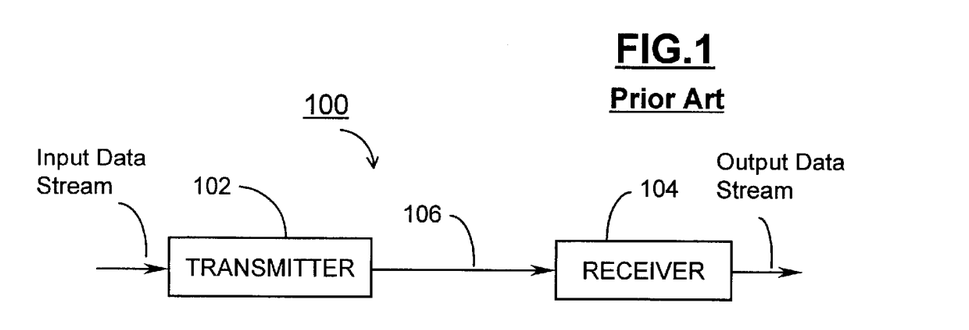
FIG. 1 is a block diagram of a conventional data communication system.

FIG. 1 shows a conventional data communication system 100 for transmitting framed data over a communications channel. The data communication system includes a transmitter 102 and a receiver 104 coupled to a communication channel 106. In a typical system, the transmitter 102 receives an input data stream from a data source (not shown) and "frames" the data before modulating it for transmission over the communication channel 106. Modulation methods for data transmission are well known to those skilled in the art and need not be described for an understanding of the present invention. The framed data is transmitted over the channel 106 in the form of a modulated signal, which in turn is received and demodulated by the receiver 104. After the signal is demodulated, the receiver 104 "deframes" the framed signal and thus provides an output data stream. Ideally, in the absence of bit errors, the output data stream is merely a time delayed copy of the input data stream.

Figure 2:
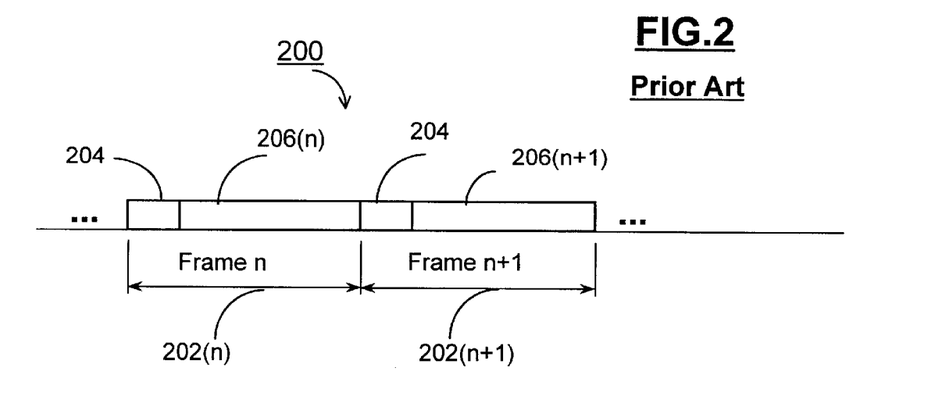
FIG. 2 is a diagram of two consecutive prior art data frames.

FIG. 2 shows "Prior Art 200" consisting of two consecutive prior art data frames 202(n) and 202(n+1). Each frame 202(n) and 202(n+1) includes a conventional frame sync word (FSW) 204 located at the beginning of each data frame 202(n) and 202(n+1). Each frame further includes a data word portion 206(n), 206(n+1) containing data or "payload" information representing the input data stream provided to the transmitter. The data word further includes, for example, overhead bits for operation, maintenance and error detection. Nominally, the data 206(n) of the n-th frame is not the same as the data of the (n+1)th frame. The frames may be of variable length, but in many communication systems the frame lengths are the same length.

Each of the data word portions 206(n) and 206(n+1) further include a plurality of "stuff bits" which are usually added at the end of each frame in order to correct timing offsets between the transmitter and receiver clocks and thus preserve timing synchronization between the transmitter and the receiver. An example of the use of stuff bits is described in detail in the ANSI Technical Report of Apr. 22, 1996, "High-Bit-Rate Digital Subscriber Lines (HDSL), which is herein incorporated by reference in its entirety. Also, an example of a data frame structure using stuff bits (sb) and stuff bit identifiers (sbid's) is shown in Table 1. Table 1 is reproduced below as found in the ANSI draft standard for HDSL2, p. 18 (Jun. 7–11, 1999), which is also herein incorporated by reference in its entirety.

TABLE 1

HDSL2 Detailed Frame Structure

| Time | Frame Bit # | HOH Bit # | Abbrev. Name | Full Name |
|---|---|---|---|---|
| 0 ms | 1–10 | 1–10 | FSW 1–10 | Sync word |
|  | 1–2326 | — | B1 | Payload block 1 |
|  | 2327 | 11 | crc1 | cyclic redundancy check |

TABLE 1-continued

HDSL2 Detailed Frame Structure

| Time | Frame Bit # | HOH Bit # | Abbrev. Name | Full Name |
|---|---|---|---|---|
| | 2328 | 12 | crc2 | cyclic redundancy check |
| | 2329 | 13 | sbid1 | stuff bit id copy 1 |
| | 2330 | 14 | load | DS1 Loss of Signal Defect |
| | 2331–2338 | 15–22 | EOC01–08 | EOC bit 1 through bit 8 |
| | 2339–4654 | — | B2 | Payload block-2 |
| | 4655 | 23 | crc3 | cyclic redundancy check |
| | 4656 | 24 | crc4 | cyclic redundancy check |
| | 4657 | 25 | uib | Unspecified Indicator Bit |
| | 4658 | 26 | sega | Segment Anomaly |
| | 4659–4666 | 27–34 | EOC09–16 | EOC bit 9 through bit 16 |
| | 4667–6982 | — | B3 | Payload block 3 |
| | 6983 | 35 | crc5 | cyclic redundancy check |
| | 6984 | 36 | crc6 | cyclic redundancy check |
| | 6985 | 37 | sbid2 | stuff bit id copy 2 |
| | 6986 | 38 | segd | Segment Defect |
| | 6987–6994 | 39–46 | EOC17–24 | EOC bit 17 through bit 24 |
| 6 − 2/1552 ms | 6995–9310 | — | B4 | Payload block 4 |
| 6 − 1/1552 ms | 9311 | 47 | sb1 | stuff bit 1 |
| 6 ms nominal | 9312 | 48 | sb2 | stuff bit 2 |
| 6 + 1/1552 ms | 9313 | 49 | sb3 | stuff bit 3 |
| 6 + 2/1552 ms | 9314 | 50 | sb4 | stuff bit 4 |

Figure 3:
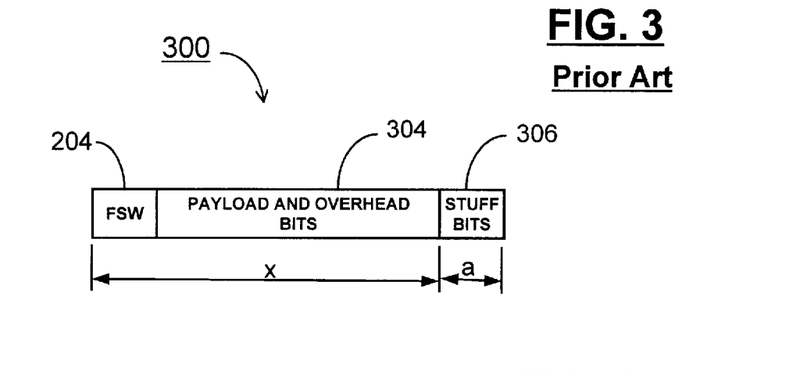
FIG. 3 is a diagram of a conventional frame structure having a frame sync word, payload data bits and stuff bits.

FIG. 3 shows a further representation of a conventional data frame 300 having an FSW 204 followed by payload and overhead bits 304 and stuff bits 306. The length of the data frame 300 excluding the stuff bits 306 is denoted by "x"; the length of the data frame 300 including the stuff bits 306 is denoted by "(x+a)". With the frame shown in Table 1, the stuff bits 306 are added only when a clock offset correction is required. Thus, when the stuff bits 306 are added the length of "x" in Table 1 is 9310 bits and "a" is 4 bits, and the total length of the data frame 300 is 9314 bits. An analysis of conventional transmitters, such as described in the above-referenced HDSL2 standard, in a telecommunication system such as the one shown in FIG. 2 indicates that stuff bits 306 are inserted approximately every sixth frame, but typically more frequently. For zero clock offset, the stuff bits 306 are added to the data frame 300 on average one half of the time. For positive clock offset, the stuff bits 306 are added more frequently and for negative clock offset, the stuff bits 306 are added less frequently.

With respect to the HDSL2 frame structure shown in Table 1, Frame Bits 1–10 correspond to the FSW bits used in conventional data communication systems to establish frame synch or resync. Frame Bits 1–10 of Table 1 thus correspond to the FSW 204 of FIG. 3. Frame Bits 11–9310 correspond to the payload and overhead bits 304 of FIG. 3. Frame bits 9311 through 9314 correspond to the stuff bits 306 of FIG. 3, which are used to correct timing offsets associated with the receiver as described above.

In operation, the stuff bits 306 as shown in FIG. 3 are followed by the FSW of the next data frame. Hence the stuff bits of a first data frame and the immediately following FSW of a second data frame form a sequence of data bits that are interpreted in accordance with the present invention as a "long" FSW.

Figure 4:
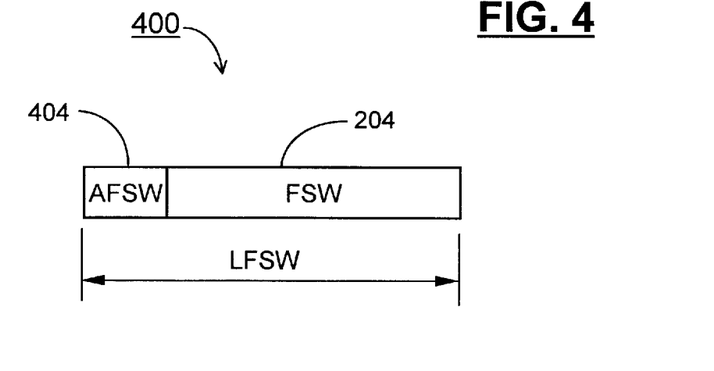
FIG. 4 is a diagram of a long frame sync word in accordance with a preferred embodiment of the present invention.

FIG. 4 shows a diagram of a "long" frame sync word (LFSW) 400 in accordance with a preferred embodiment of the present invention. The LFSW 400 includes an FSW 204 and an attachment to a frame sync word (AFSW) 404. Thus, when the previous data frame is lengthened by adding stuff bits 404, the stuff bits 404 of the previous data frame together with the FSW 204 bits of the current data frame to provide the LFSW 400 for the current data frame. When the bits are selected appropriately, as shown for example in FIG. 5, the LFSW 400 exhibits an enhanced sync property when compared to the conventional FSW of FIG. 3.

Figure 5:
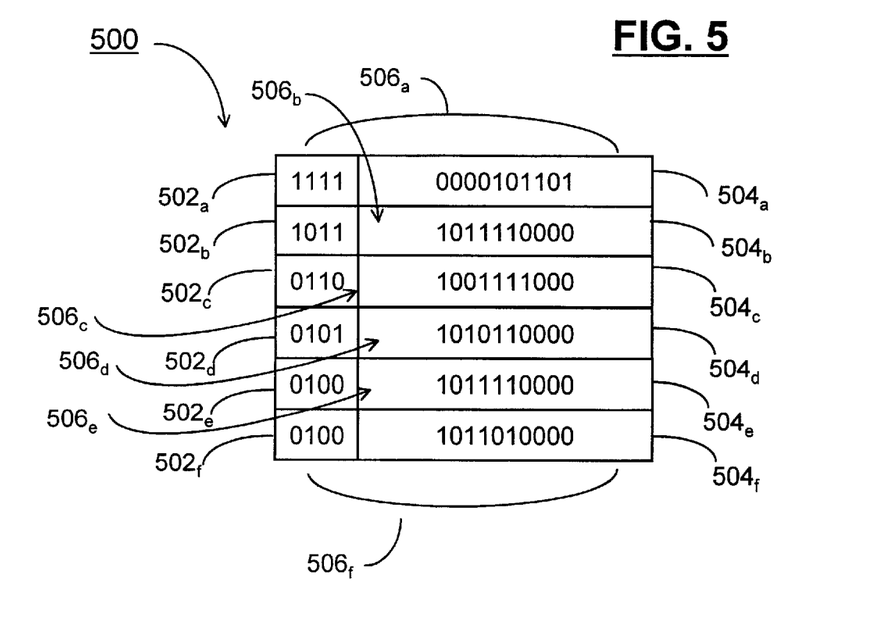
FIG. 5 is a diagram showing examples of long frame sync words having enhanced sync characteristics in accordance with the present invention.

FIG. 5 shows stuff bit and FSW combinations 500 that have been shown by the inventors to exhibit complementary sync characteristics. When combined as shown in FIG. 5, the resulting LFSW's exhibit an enhanced sync property that allows a faster mean time-to-sync (MTTS) time as compared to conventional frame sync methods using only an FSW to establish frame sync. For example, the combination 502a/504a of stuff bits "1111" with frame sync word "0000101101" has been shown by the inventors to yield an LFSW 506a "11110000101101" having an enhanced sync property resulting in a substantially reduced MTTS. The reduction in MTTS times resulting from the enhanced sync property of the LFSW is discussed below with reference to Table 2. Similarly, stuff bits 502b through 502f and frame sync words 504b through 504f can be combined as shown in FIG. 5 to produce LFSW's each having an enhanced sync property.

Figure 6:
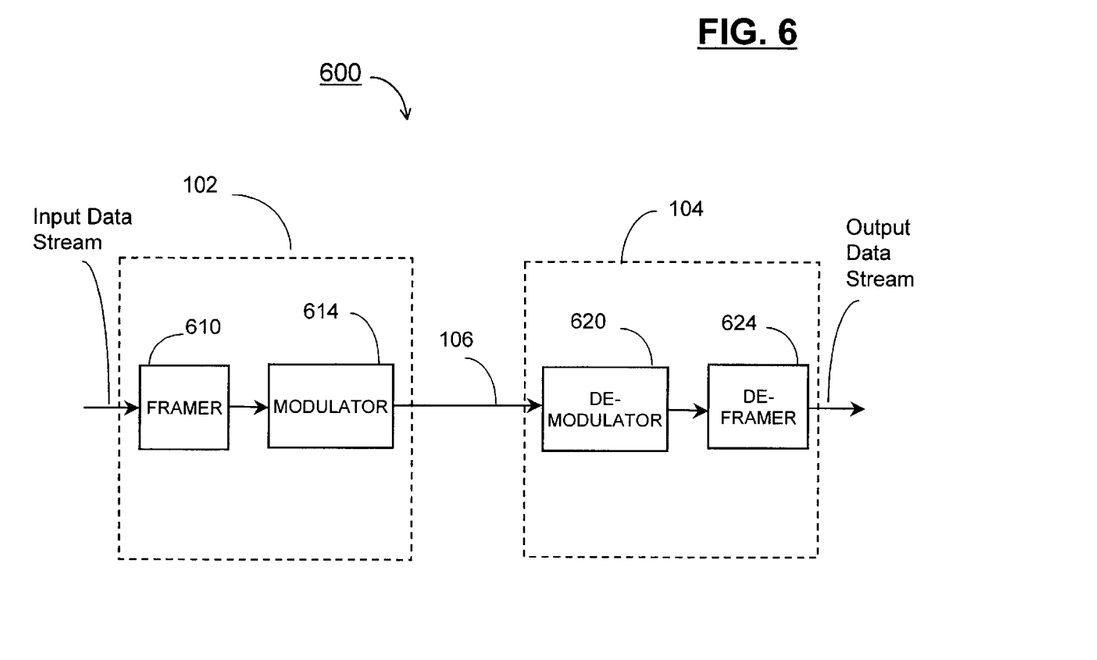
FIG. 6 is a block diagram of a system for frame in accordance with a preferred embodiment of the present invention.

FIG. 6 shows a block diagram of a system 600 for acquiring frame synchronization in accordance with a preferred embodiment of the present invention. A framer 610, which can be implemented using gate arrays or application specific integrated circuit (ASIC's) as known and understood by those of skill in the art, generates an FSW and then appends payload and overhead bits to form a data frame. Stuff bits as shown in FIG. 5 are included in the data frame when timing offset correction is required. Whether stuff bits are required is determined by known circuitry in the transmitter which determines whether there is a discrepancy between a transmitter or network clock and a receiver or local clock. As the data frame is generated, bits of the frame are sent to a modulator 614. A second data frame and subsequent data frames are also sent to the modulator 614. The modulator 614 generates and sends a transmitter signal to the receiver 104 over a communications channel 106. A demodulator 620 in the receiver 104 then demodulates the received transmitter signal and sends a demodulated signal to the deframer 624. The deframer then detects whether an LFSW is present in the framed data. The LFSW is detected using an LFSW detector which is preferably comprised of a modified deframer having gate array or ASIC circuitry. Preferably, LFSW the includes stuffbits "0101" and FSW "1010110000" as shown in FIG. 5.

Figure 7:
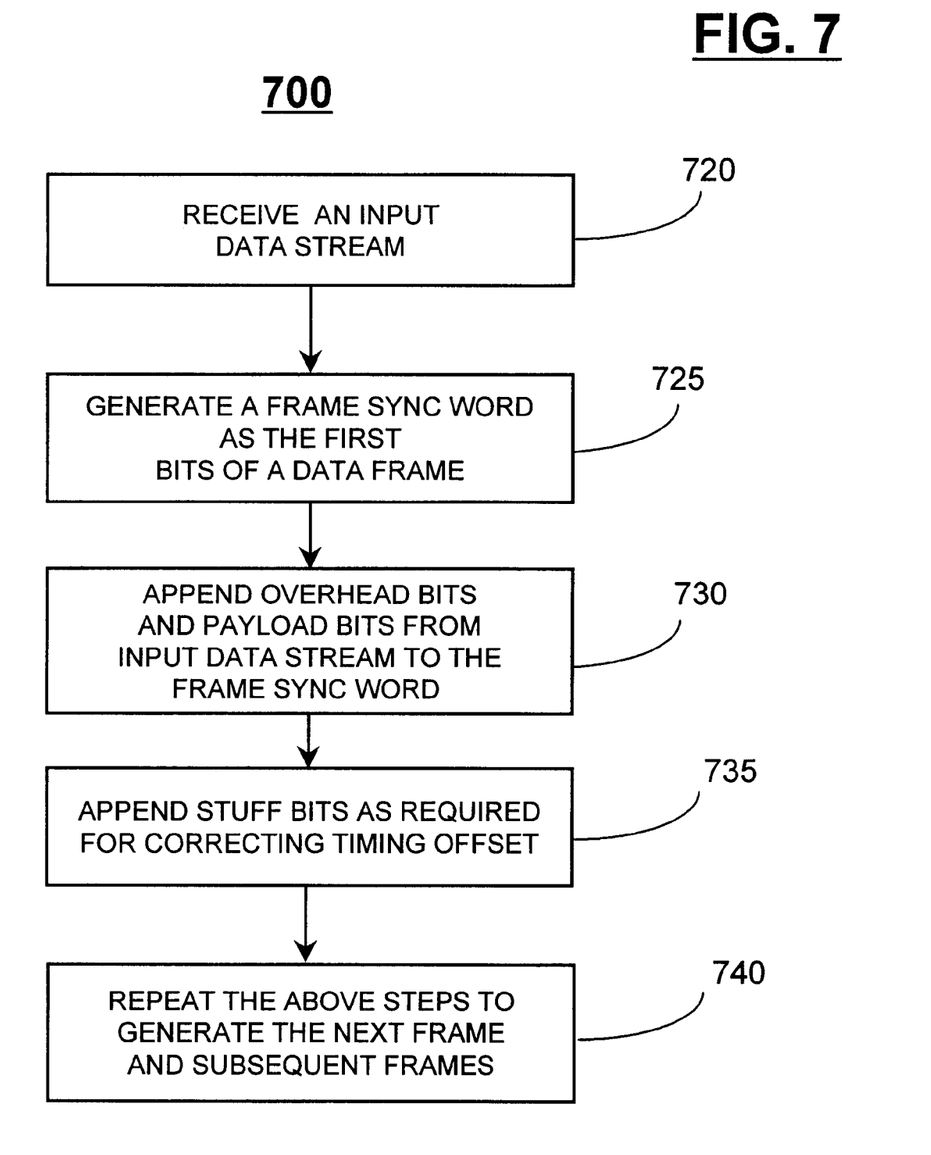
FIG. 7 is a flow diagram of a method for generating data frames in accordance with a preferred embodiment of the present invention.

FIG. 7 shows a flow diagram 700 of a method for generating data frames in accordance with a preferred embodiment of the present invention. An input data stream is received by the framer of the transmitter, step 720. The frame is generated by placing a frame sync word as the first bits of the data frame, step 725. Next, bits from the data stream and overhead bits are inserted into the frame, step 730. If timing offset correction is required, then stuff bits are attached to the end of the frame, step 735, to complete the frame. Preferred stuff bits are shown for example in FIG. 5. After the frame is complete, the above steps are repeated to generate the next and subsequent frames, step 740.

In addition, stuff bit identifiers (sbids) can be inserted as overhead bits between the FSW and the end of the data frame. When both sbids are "1" a stuff bit is attached to the end of the frame, but when both sbids are "0" stuff bits are not attached to the end of the frame. In a preferred embodiment, the stuff bits are "0101" and the FSW is "1010110000" as shown by 502d and 504d of FIG. 5. The frames are then provided to a modulator, which in turn generates a transmitter signal for transmission over a communications channel to a demodulator in the receiver.

Figure 8:
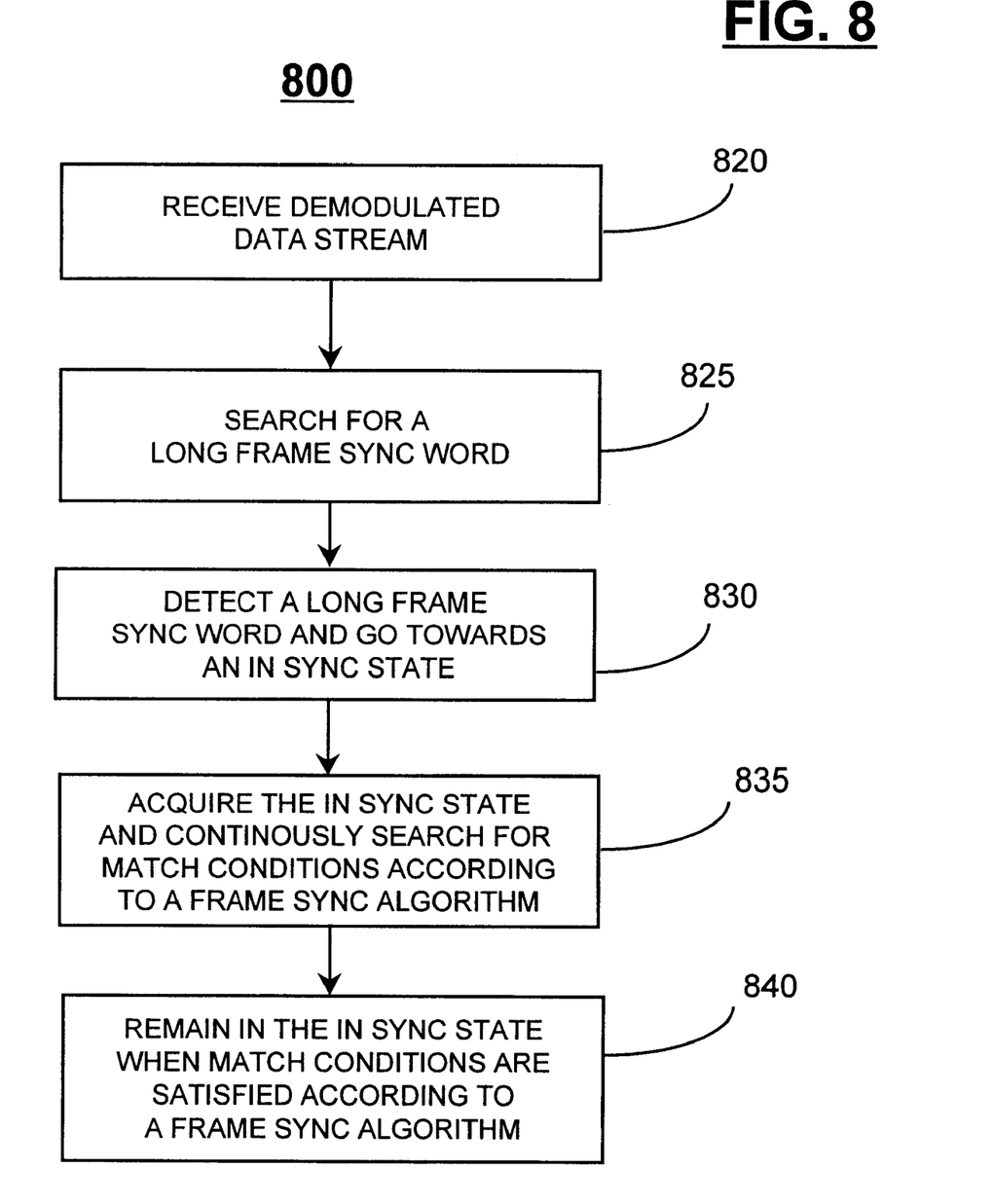
FIG. 8 is a flow diagram of a method for acquiring frame sync or resync in accordance with a preferred embodiment of the present invention.
Figure 9:
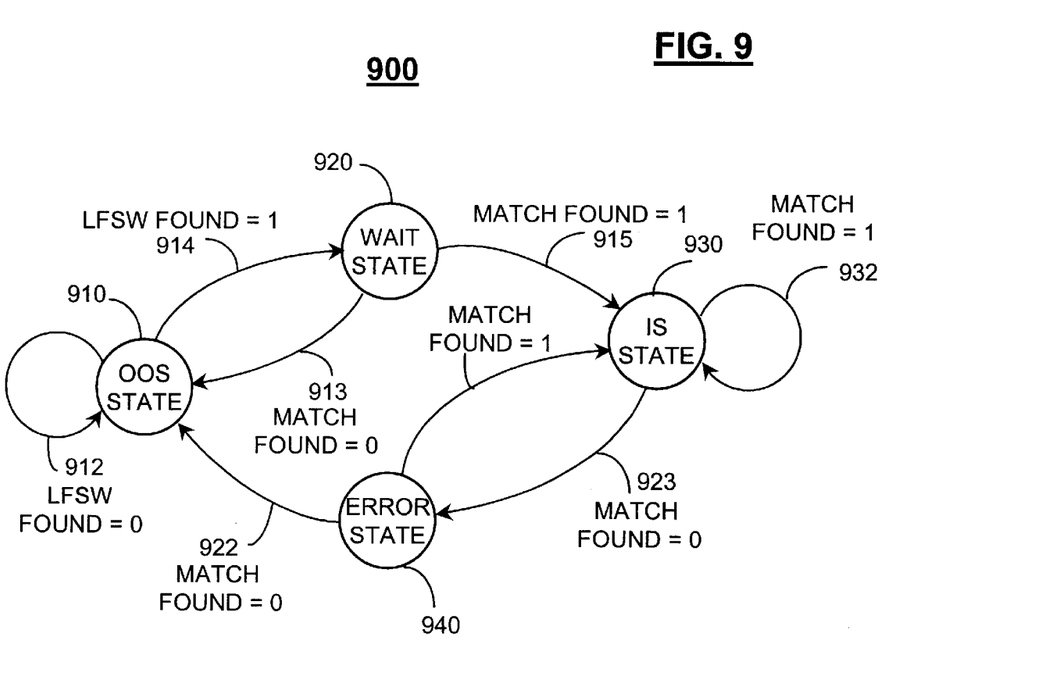
FIG. 9 is a state diagram corresponding to a method for acquiring frame sync or resync in accordance with a preferred embodiment of the present invention.

FIG. 8 shows a method 800 for acquiring frame sync or resync at the receiver in accordance with a preferred embodiment of the present invention. A deframer receives the demodulated data stream, step 820, and then searches for an LFSW, step 825. Preferably, the LFSW is a sequence having a value of "01011010110000" or other value as shown in FIG. 5. After detecting the LFSW, the deframer goes towards an "in-sync" state according to a frame synchronization algorithm, step 830. FIG. 9 shows a preferred embodiment of a frame synchronization algorithm in accordance with the present invention. Upon reaching the "in-sync" state, the deframer continuously looks for the FSW to maintain the "in-sync" state, step 835. As long as the FSW is detected in the correct time slot, then the "in-sync" state is maintained, step 840.

Figure 10:
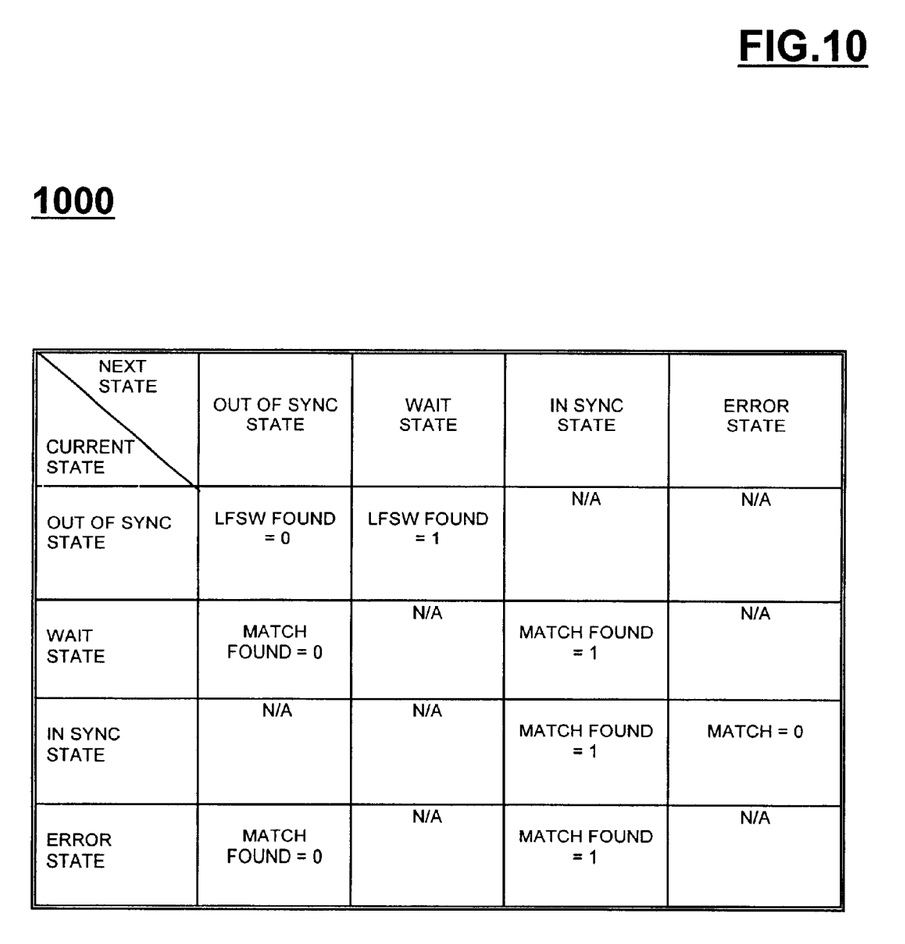
FIG. 10 is a state table corresponding to the state diagram of FIG. 9.

FIG. 9 is a state diagram 900 illustrating a frame synchronization (resynchronization) algorithm in accordance with a preferred embodiment of the present invention. FIG. 10 is the corresponding state transition table 1,000. Preferably, the algorithm is implemented in the deframer by hardware or a combination of hardware and software.

Referring again to FIG. 9, when the transmitter is turned on and the receiver starts receiving data, the data frame arriving at the deframer does not have frame sync and is thus in an "out-of-sync" state (OOS STATE) 910 (912 LFSW FOUND=0). A sync word detector looks for the LFSW. When the LFSW is found, a condition (914) LFSW FOUND="1" exists which causes a state transition from the OOS STATE 910 to a "going to in-sync" state (WAIT STATE) 920. In the WAIT STATE 920, a bit counter is started. If an FSW is detected when the bit counter reaches a predetermined count, then a MATCH FOUND="1" condition (915) exists and the receiver transitions into an "in-sync" state (IS STATE) 930 occurs. However, if an FSW is not detected when the bit counter reaches the predetermined count, then a transition is made from the WAIT STATE 920 back to the OOS STATE 910 (condition 913, MATCH FOUND=0).

Further, while the receiver is in the IS STATE 930, the sync word detector continues to look for subsequent FSW's and remains in the IS STATE 930 if a the match condition (932) MATCH FOUND="1" remains. If no match is found i.e., condition 923 (MATCH FOUND=0), a transition is made to a "going out-of-sync" state (ERROR STATE) 940. When in the ERROR STATE 940, a transition back to the IS STATE 910 is made if a subsequent match is found, i.e., MATCH FOUND="1". If no match is found, then a transition (condition 922, MATCH FOUND=0) is made from the WAIT STATE 920 back to the OOS STATE 910 and the sync process repeats.

As shown by Table 2 below, the method of the present invention has been shown to yield MTTS times that are approximately twice as fast as the MTTS times of the prior art. In addition the time to resync (going from the ERROR STATE 940 back to the IS STATE 930) is improved by nearly a factor of two. The improvements of MTTS and time to resync reduce the amount of data loss when impairments cause data transmission errors. Table 2 shows typical MTTS values for an HDSL2 communication system. Further details regarding the assumptions made for the results shown in Table 2 are discussed in detail in the paper entitled "Analysis of HDSL2 Frame Synchronization", by Kevin W. Schneider and Marc Kimpe, T1E1.4/98–286, Committee T1—Telecommunications, Working Group T1E1.4, San Antonio, Tex. (Sep. 3, 1998).

TABLE 2

Mean Time to Sync (MTTS) for HDSL2 FRAMES (FSW vs. LFSW)

| | LENGTH OF FSW (IN BITS) | | | | | | | |
|---|---|---|---|---|---|---|---|---|
| | 8 | 9 | 10 | 11 | 12 | 13 | 14 | 15 |
| MEAN TIME TO SYNC FOR FSW (# of Frames) | 20.69 | 11.59 | 7.05 | 4.77 | 3.64 | 3.07 | 2.78 | 2.64 |
| MEAN TIME TO SYNC FOR LFSW (# of Frames) | 5.30 to 7.76 | 4.15 to 5.38 | 3.58 to 4.19 | 3.29 to 3.60 | 3.15 to 3.30 | 3.07 to 3.15 | 3.04 to 3.08 | 3.02 to 3.04 |

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

What is claimed is:

1. A method for acquiring frame synchronization or resynchronization in a system communicating data frames between a transmitter and a receiver, the method comprising the steps of:

generating a first frame sync word located at the beginning of a first data frame;

appending payload and overhead bits to the end of the first frame sync word;

appending stuff bits to the end of the payload and overhead bits, wherein the stuff bits function to correct timing offsets;

generating a second frame sync word located at the beginning of the a second data frame;

detecting a long frame sync word formed by the combination of the stuff bits and the second frame sync word; and acquiring frame synchronization based at least in part upon the detected long frame sync word.

2. The method according to claim 1, wherein the step of appending stuff bits comprises appending a sequence of stuff bits having a complementary synchronization characteristic when combined with the second frame sync word.

3. The method according to claim 1, wherein:
the step of appending stuff bits comprises using a bit sequence "0101"; and
the step of generating a second frame sync word comprises using a bit sequence "1010110000".

4. The method according to claim 1, wherein:
the step of appending stuff bits comprises using a bit sequence "1111"; and
the step of generating a second frame sync word comprises using a bit sequence "0000101101".

5. The method according to claim 1, wherein:
the step of appending stuff bits comprises using a bit sequence "1011"; and
the step of generating a second frame sync word comprises using a bit sequence "1011110000".

6. The method according to claim 1, wherein:
the step of appending stuff bits comprises using a bit sequence "0110"; and
the step of generating a second frame sync word comprises using a bit sequence "1001111000".

7. The method according to claim 1, wherein said step of acquiring frame synchronization comprises:
transitioning from an out-of-sync state to a wait state if the long frame synchronization word is detected; and
transitioning from the wait state to an in-sync state if a frame sync word match condition is satisfied.

8. The method according to claim 7, further comprising the step of transitioning from the wait state to the out-of-sync state if the frame sync word match condition is not satisfied.

9. The method according to claim 7, further comprising the step of remaining in the in-sync state so long as the frame sync word match condition for subsequent data frames is satisfied.

10. The method according to claim 7, further comprising the steps of:
transitioning from the in-sync state to an error state if the frame sync word match condition is not satisfied for an immediately following data frame;
transitioning from the error state back to the in-sync state if the frame sync word match condition is satisfied for a next data frame; and
transitioning from the error state to the out-of-sync state if the frame sync word match condition is not satisfied for the next data frame.

11. The method according to claim 7, wherein the frame sync word match condition is satisfied by the steps of:
initiating a corresponding bit counter; and
detecting a frame sync word when the counter reaches a predetermined count.

12. A method for reducing the mean time to synchronization or resynchronization of data frames in a data communication system, the method comprising the steps of:
generating a first frame sync word located at the beginning of a first data frame;
appending payload and overhead bits to the end of the first frame sync word;
appending stuff bits to the end of the payload and overhead bits, wherein the stuff bits function to correct timing offsets and further the stuff bits having a complementary sync characteristic when combined with a second frame sync word;
generating the second frame sync word located at the beginning of the second data frame, the second frame sync word and stuff bits forming a long frame sync word having an enhanced frame synchronization property;
detecting the long frame sync word; and
acquiring frame synchronization based at least in part upon the detected long frame sync word.

13. The method according to claim 12, wherein:
the step of appending stuff bits comprises using a bit sequence "0101"; and
the step of generating a second frame sync word comprises using a bit sequence "1010110000".

14. The method according to claim 12, wherein:
the step of appending stuff bits comprises using a bit sequence "1111"; and
the step of generating a second frame sync word comprises using a bit sequence "0000101101".

15. The method according to claim 12, wherein:
the step of appending stuff bits comprises using a bit sequence "1011"; and
the step of generating a second frame sync word comprises using a bit sequence "1011110000".

16. The method according to claim 12, wherein:
the step of appending stuff bits comprises using a bit sequence "0100"; and
the step of generating a second frame sync word comprises using a bit sequence "1011110000".

17. The method according to claim 12, wherein said step of acquiring frame synchronization comprises:
transitioning from an out-of-sync state to a wait state if the long frame synchronization word is detected; and
transitioning from the wait state to an in-sync state if a frame sync word match condition is satisfied.

18. The method according to claim 17, further comprising the step of transitioning from the wait state to the out-of-sync state if the frame sync word match condition is not satisfied.

19. The method according to claim 17, further comprising the step of remaining in the in-sync state so long as the frame sync word match condition for subsequent data frames is satisfied.

20. The method according to claim 17, further comprising the steps of:
transitioning from the in-sync state to an error state if the frame sync word match condition is not satisfied for an immediately following data frame;
transitioning from the error state back to the in-sync state if the frame sync word match condition is satisfied for a next data frame; and
transitioning from the error state to the out-of-sync state if the frame sync word match condition is not satisfied for the next data frame.

21. The method according to claim 17, wherein the frame sync word match condition is satisfied by the steps of:
initiating a corresponding bit counter; and
detecting a frame sync word when the counter reaches a predetermined count.

22. A system for acquiring frame synchronization of data frames transmitted over a communications channel, the system comprising:

a framer for providing a first frame sync word at the beginning of a first data frame, for attaching a sequence of stuff bits at the end of the first data frame to correct timing offset, and for providing a second frame sync word at the beginning of a second data frame; and a deframer for detecting the occurrence of a stuff bits followed by the second frame sync word, whereby the combination of the stuff bits and the second frame sync word forms a long frame sync word having an enhanced frame synchronization property.

23. A transmitter apparatus for generating a sequence of data frames wherein the sequence contains frame sync words and long frame sync words, the apparatus comprising:

means for detecting timing offsets between a transmitter clock and a receiver clock, the detecting means providing a pulse stuff signal; and a framer for inserting a frame sync word at the beginning of each frame and for inserting sync compatible stuff bits at the end of selected frames in response to the pulse stuff signal.

24. A receiver apparatus for providing frame synchronization, comprising:

means for detecting a long frame synchronization word;

means for detecting a frame synchronization word; and circuit means for acquiring frame synchronization in response to the output of the detectors, wherein the frame synchronization circuit is an arrangement of digital circuit elements programmed according to a frame synchronization algorithm.

25. The method according to claim 1, wherein:

the step of appending stuff bits comprises using a bit sequence "0100"; and the step of generating a second frame sync word comprises using a bit sequence "1011110000".

26. The method according to claim 1, wherein:

the step of appending stuff bits comprises using a bit sequence "0100"; and the step of generating a second frame sync word comprises using a bit sequence "1011010000".

27. The method according to claim 12, wherein:

the step of appending stuff bits comprises using a bit sequence "0100"; and the step of generating a second frame sync word comprises using a bit sequence "1011110000".

28. The method according to claim 12, wherein:

the step of appending stuff bits comprises using a bit sequence "0100"; and the step of generating a second frame sync word comprises using a bit sequence "1011010000".

* * * * *